2,813,903

TREATMENT OF 2,2'-DIHYDROXY-1,1'-ALDAZINES OF THE BENZENE AND NAPHTHALENE SERIES

Harlan B. Freyermuth, Easton, Pa., assignor to General Aniline & Film Corporation, New York, N. Y., a corporation of New Jersey No Drawing. Application December 1, 1954, Serial No. 472,503

5 Claims. (Cl. 260—566)

This invention relates to a method for improving the pigment characteristics of 2,2'-dihydroxy-1,1'-aldazines of the benzene and naphthalene series.

Aldazines of the aforementioned type are well known as colored dyestuffs which fluoresce under the influence of ultraviolet light, often in the same wave length as the subtractive daylight color. As such, they find many uses in industry such as in printing inks, stains, paints, lacquers, varnishes and other coating compositions, rubber and plastics in bulk, wax compositions such as colored crayons, paper impregnation, colored concrete and similar compositions.

In the uses mentioned above, the physical properties of the subject compounds are of course very important. Such properties include shade, brilliance, transparency, coloring power, fastness to various elements, and the like. Of equal importance from a production standpoint is the physical form of the compounds prior to use. Thus, it is highly desirable that the pigment be available in the form of a soft powder which is light, fluffy, of low density, of optimum particle size, particle size distribution and particle surface characteristics, devoid of tendencies to agglomerate and the like, and readily susceptible of grinding with or without other media to produce products of optimum application strength.

The instant invention is based upon the discovery that aldazines of the above type may be dissolved in sulfuric acid, the solution rapidly drowned in water, the resulting precipitated dye suspension rapidly mixed with an emulsion comprising an inert water immiscible volatile organic liquid emulsified in water with the aid of a water soluble surface active agent, and the pigment recovered by removing excess liquid, washing acid free and drying. The dried material is a soft powder which has highly desirable particle size, particle size distribution and particle surface characteristics. Since compounds containing the group —CH=N— are well known as being unstable in sulfuric acid, it was entirely unforseen that it would be possible to dissolve 2,2'-dihydroxy-1,1'-aldazines of the benzene and naphthalene series in sulfuric acid without decomposing them. Equally surprising is the highly improved tinctorial strength of the product obtained in accordance with the instant process. Such products are generally much brighter, have considerably more fluorescence under the influence of ultraviolet light and/or have application strengths of up to 50% or more greater than the products prior to subjection to the instant process.

The products to which the process of this invention is applicable correspond to compounds having the formula

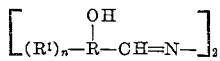

wherein R is selected from the group consisting of benzene and naphthalene, R¹ is selected from the group consisting of alkyl, alkoxy, halogen, nitro, hydroxy and amino, n has a value of 0 to 3, and the OH group bonded to R is in ortho position relative to the —CH=N— group. In the above formula, R¹ may, for example, be methyl, ethyl, propyl, butyl, chloro, bromo, nitro, hydroxy, amino, methoxy, ethoxy, butoxy, or the like. Where n has a value of more than 1, it will be understood that R¹ may be the same or different. These compounds may be prepared in accordance with the known prior art methods by condensing a methanol or ethanol solution of the requisite 2-hydroxy-1-benzaldehyde, or -naphthaldehyde at preferably reflux temperatures wtih hydrazine or one of its salts such as the sulfate. The preferred aldazines for treatment in accordance with the instant invention are 2,2'-dihydroxy-1,1'-naphthaldazine and 2,2'-dihydroxy-1,1'-benzaldazine.

The sulfuric acid in which the aldazine is to be dissolved is preferably of a weight concentration ranging from about 65 to 86%. While these concentrations may be somewhat departed from, it has been found that higher concentrations lead to some loss due to sulfonation and that lower concentrations have a reduced solvent action on the 2,2'-dihydroxy-1,1'-aldazine. In general, sufficient sulfuric acid is employed to dissolve the aldazine, although amounts in excess of this minimum may be employed if so desired. The sulfuric acid solution of aldazine should be drowned in a sufficient volume of water to precipitate substantially all of the aldazine. In general, this may be accomplished by use of an amount of drowning water sufficient to reduce the sulfuric acid concentration to less than 5% and preferably less than 1% by weight.

The emulsion to be mixed with the precipitated dye suspension comprises, as stated above, an inert water immiscible volatile organic liquid emulsified in water with the aid of a water-soluble surface active agent of the emulsifying type. The water immiscible liquid employed, which by definition must be liquid at the temperature of treatment, which may range from room temperature to about 70° C., should be sufficiently volatile to allow its being removed in the final drying step. This includes volatility at a temperature below the decomposition temperature of the aldazine. The water immiscible liquid should, as indicated, also be inert with respect to the aldazine in that it should not be reactive therewith or have any appreciable solvent action thereon. The chemical constitution of said liquid is not important so long as it has the indicated properties. As examples of liquids which may be employed in the instant invention, there may be mentioned petroleum naphthas such as Apco thinner, Stoddard's solvent, Solvesso #2 (an essentially aromatic petroleum hydrocarbon fraction), benzene, toluene, xylene, toluol, p-cymene, mesitylene, turpentine, terpenes, pinenes, nitrobenzene, halogenated aliphatic and aromatic hydrocarbons including trichloroethylene, ethylene dichloride, carbontetrachloride, symmetrical tetrachloroethane, chlorobenzene, hydrogenated aromatic hydrocarbons including Tetralin (tetrahydronaphthalene), Decalin (decahydronaphthalene), cyclohexane, water-insoluble higher aliphatic alcohols such as n-butyl alcohol, mixed hexanes, esters such as amylbutyrate, amyl silicate, ethers such as amylbenzyl ether, diamylether, dibutyl ether, diphenyl ether, n-butylethanol ether, or mixtures thereof or the like. Obviously this liquid should be stable in dilute acid.

The particular water-soluble surface active agent to be employed for producing the aqueous emulsion of water immiscible liquid is likewise not critical provided it is also stable in dilute acid and inert with respect to the aldazine. As examples of suitable surface active agents which may be employed in the instant invention, there may be mentioned soluble oils such as Turkey red oil, and other sulfonated oils, terpene oils, esters of sodium sulfosuccinic acid (such as the dioctyl ester, diamyl ester or the like), various organic sulfates and sulfonates such as sodium tetrahydronaphthalene sulfate, sulfated oleyl alcohol, sulfonates and esters of other high molecular weight alcohols, esters and lactones, lecithin and other phosphatides, octyl alcohol, and inorganic agents such as certain soluble silicates and phosphates or the like, or mixtures thereof. In some cases, for example, it may be desirable to employ a surface active agent soluble in water and a different surface active agent soluble in the water immiscible liquid.

The amount of surface active agent to be employed in making the emulsion will generally be from about 2 to 15% by weight of the water immiscible liquid. The amount of water included in the emulsion is not critical so long as sufficient water is employed to produce an oil-in-water emulsion in which the water immiscible liquid is finely dispersed. The amount of water immiscible liquid to be employed should be sufficient to coat the individual particles of aldazine, and in general, may range from about 20 to 100% by weight of the aldazine.

The aqueous emulsion may be mixed with the precipitated dialdazine suspension in any desired manner. However, since addition of the said suspension to the emulsion may cause localized heating with concurrent possibilities of vaporization of the water immiscible liquid, it is preferred to add the emulsion to the suspension.

After the aqueous emulsion is mixed with the precipitated dialdazine suspension, the treated pigment may be separated from the liquid by any of the usual means, such as decantation, centrifugation, filtration, or the like. The pigment is then washed acid free, and dried at suitable elevated temperatures below the decomposition point of the aldazine. The resulting pigment is a soft powder which is readily ground in a hammer-mill or ball mill or the like, to produce a powder having highly desirable properties with respect to particle size, particle size distribution and particle surface characteristics and improved tinctorial strength.

The following examples in which parts are by weight unless otherwise indicated, are illustrative of preferred embodiments of this invention and are not to be regarded as limitative.

Example I 40 parts of 2,2'-dihydroxy-1,1'-naphthaldazine was gradually added to 600 parts 80% sulfuric acid at 15–20° C. during 20 minutes and stirred for 2 hours at room temperature. This solution was then drowned with stirring into 15 times its weight in water at 60° C. 20 parts of Apco thinner was emulsified in a blending mixer with 2 parts Aerosol OT (dioctyl ester of sodium sulfosuccinic acid) and 20 parts water. The mixture was added to the precipitated dye suspension and stirred overnight. The pigment was filtered, washed acid free and dried at 50°

C. The dried material was ground in a hammer mill. The product was an improved soft powder having exceptional application strength.

Example II

The procedure of Example I was repeated except that it was applied to an equivalent amount of 2,2'-dihydroxy-1,1'-benzaldazine instead of the naphthaldazine. The resulting product was a similarly improved, colorless soft powder fluorescing under ultraviolet light.

This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

I claim:

1. A process comprising dissolving an aldazine of the formula

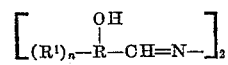

wherein R is selected from the group consisting of benzene and naphthalene, $R^1$ is selected from the group consisting of lower alkyl and alkoxy, chloro, bromo, nitro, hydroxy and amino, $n$ has a value of 0 to 3, and the hydroxy group bonded to R is in ortho position relative to the —CH=N— group, in sulfuric acid having a concentration of about 65 to 86% by weight, drowning the resulting solution in water to precipitate the aldazine, mixing the resulting suspension with an emulsion comprising an inert water immiscible volatile organic liquid emulsified in water with the aid of a water-soluble anionic surface active agent, and then separating the precipitated aldazine from the mixture.

2. A process as defined in claim 1 wherein the aldazine is 2,2'-dihydroxy-1,1'-naphthaldazine.

3. A process as defined in claim 1 wherein the aldazine is 2,2'-dihydroxy-1,1'-benzaldazine.

4. A process as defined in claim 1 wherein the water immiscible liquid is a petroleum naphtha.

5. A process as defined in claim 1 wherein the surface active agent is the dioctyl ester of sodium sulfosuccinic acid.

References Cited in the file of this patent

UNITED STATES PATENTS

| | | |
|---|---|---|
| 2,192,954 | Sloan et al. | Mar. 12, 1940 |
| 2,213,693 | Davies et al. | Sept. 3, 1940 |
| 2,230,353 | Kern | Feb. 4, 1941 |
| 2,282,006 | Sloan | May 5, 1942 |
| 2,375,120 | Lonkomsky et al. | May 1, 1945 |